United States Patent
Park et al.

(10) Patent No.: US 10,347,427 B2
(45) Date of Patent: Jul. 9, 2019

(54) MULTILAYER CERAMIC ELECTRONIC COMPONENT INCLUDING EXTERNAL ELECTRODES HAVING EXTENDED BAND PORTIONS ON ONE SURFACE OF BODY OF MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Yong Park, Suwon-si (KR); Ki Pyo Hong, Suwon-si (KR); Jin Yung Ryu, Suwon-si (KR); Jae Yeol Choi, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/493,619

(22) Filed: Apr. 21, 2017

(65) Prior Publication Data

US 2018/0068795 A1    Mar. 8, 2018

(30) Foreign Application Priority Data

Sep. 8, 2016    (KR) .......................... 10-2016-0115663

(51) Int. Cl.
*H01G 4/30*    (2006.01)
*H01G 4/012*    (2006.01)
(Continued)

(52) U.S. Cl.
CPC .............. *H01G 4/30* (2013.01); *H01G 4/012* (2013.01); *H01G 4/232* (2013.01); *H01G 4/2325* (2013.01); *H01G 4/12* (2013.01)

(58) Field of Classification Search
CPC ............ H01G 4/30; H01G 4/12; H01G 4/012; H01G 4/2325
See application file for complete search history.

(56) References Cited

U.S. PATENT DOCUMENTS 8,837,112 B2 * 9/2014 Gu .......................... H01G 4/12
361/301.2
2011/0266040 A1   11/2011 Kim et al.
(Continued)

FOREIGN PATENT DOCUMENTS

JP    60-240116 A    11/1985
JP    62-195111 A    8/1987
(Continued)

OTHER PUBLICATIONS

Korean Office Action issued in corresponding Korean Patent Application No. 10-2016-0115663, dated Mar. 25, 2018, with English Translation.
(Continued)

*Primary Examiner* — David M Sinclair
(74) *Attorney, Agent, or Firm* — Morgan Lewis & Bockius LLP

(57) ABSTRACT

A multilayer ceramic electronic component includes: a ceramic body including dielectric layers and internal electrodes, stacked to be alternately exposed to one end surface and the other end surface of the ceramic body, with each of the dielectric layers interposed therebetween; and external electrodes disposed on outer surfaces of the ceramic body. The external electrodes include electrode layers connected to the internal electrodes, electrically insulating layers disposed on the electrode layers, and plating layers disposed on one surface of the ceramic body in a thickness direction of the ceramic body and connected to the electrode layers, respectively, and the electrode layers contain nickel.

14 Claims, 3 Drawing Sheets

(51) Int. Cl.
*H01G 4/232* (2006.01)
*H01G 4/12* (2006.01)

(56) References Cited

U.S. PATENT DOCUMENTS

| | | | |
|---|---|---|---|
| 2013/0182368 A1* | 7/2013 | Jeon | H01G 4/30 361/301.4 |
| 2014/0041930 A1* | 2/2014 | Yanagida | H05K 7/00 174/549 |
| 2014/0116766 A1* | 5/2014 | Jeon | H05K 3/3442 174/260 |
| 2015/0022945 A1* | 1/2015 | Park | H01G 4/30 361/301.4 |
| 2015/0043125 A1* | 2/2015 | Park | H01G 4/12 361/301.4 |
| 2015/0083475 A1* | 3/2015 | Kim | H01G 4/232 174/260 |
| 2015/0084481 A1* | 3/2015 | Mori | H01C 1/148 310/311 |
| 2015/0124370 A1* | 5/2015 | Ahn | H01G 4/224 361/272 |
| 2016/0276104 A1* | 9/2016 | Nishisaka | H01G 4/2325 |
| 2017/0271081 A1* | 9/2017 | Maki | H01G 4/248 |
| 2017/0278634 A1* | 9/2017 | Kato | H01G 4/0085 |

FOREIGN PATENT DOCUMENTS

| | | |
|---|---|---|
| JP | 04-320017 A | 11/1992 |
| JP | 05-167225 A | 7/1993 |
| JP | 11-260653 A | 9/1999 |
| JP | 2012-004189 A | 1/2012 |
| JP | 2013-098540 A | 5/2013 |
| JP | 2014-036149 A | 2/2014 |
| JP | 2015-204451 A | 11/2015 |
| KR | 10-2011-0122008 A | 11/2011 |
| KR | 10-2013-0084852 A | 7/2013 |

OTHER PUBLICATIONS

Office Action issued in corresponding Korean Patent Application No. 10-2016-0115663, dated Aug. 29, 2017 with English Translation.

* cited by examiner

I-I'

100
MULTILAYER CERAMIC ELECTRONIC COMPONENT INCLUDING EXTERNAL ELECTRODES HAVING EXTENDED BAND PORTIONS ON ONE SURFACE OF BODY OF MULTILAYER CERAMIC ELECTRONIC COMPONENT

CROSS-REFERENCE TO RELATED APPLICATION(S)

This application claims benefit of priority to Korean Patent Application No. 10-2016-0115663 filed on Sep. 8, 2016 in the Korean Intellectual Property Office, the disclosure of which is incorporated herein by reference in its entirety.

TECHNICAL FIELD

The present disclosure relates to a multilayer ceramic electronic component and a method of manufacturing the same.

BACKGROUND

In accordance with the recent trend toward miniaturization of electronic products, multilayer ceramic electronic components have also been required to have a small size and large capacitance.

Therefore, various methods for decreasing thicknesses of dielectric layers and internal electrodes and increasing the number of dielectric layers and internal electrodes have been attempted, and, recently, the number of multilayer ceramic electronic components, in which thicknesses of dielectric layers are decreased and the number of stacked dielectric layers is increased, that have been manufactured, has continued to increase.

In addition, as external electrodes have also been required to have a decreased thickness, a problem in which a plating solution permeating the multilayer ceramic electronic component through the external electrodes having the decreased thickness may occur, such that it is technically difficult to miniaturize the multilayer ceramic electronic component.

In particular, in a case in which shapes of the external electrodes are non-uniform, a risk that the plating solution will penetrate into thin portions of the external electrodes is further increased, such that a problem occurs in securing reliability.

Meanwhile, in a case of forming the external electrodes by an existing dipping method, or the like, which is a method of forming the external electrodes, the external electrodes are formed on all head surfaces, corresponding to end surfaces of a body in a length direction of the body, and four surfaces (hereinafter, referred to as "band surfaces") contacting the head surfaces, and it is difficult to uniformly apply a paste for an external electrode, due to generation of dispersion in the body and fluidity and viscosity of the paste, such that a difference in a thickness of the applied paste is generated.

In addition, the plating solution penetrates into a portion in which the paste is thinly applied, due to a decrease in density of the portion, such that reliability is reduced, and glass beading or blistering, when glass is exposed to a surface, is generated in a portion in which the paste is thickly applied, such that a thickness of a plating layer should be increased in order to solve a plating defect and a shape defect.

Therefore, when an application thickness of the external electrode is thin and uniform, a formation area of the internal electrodes may be increased, such that capacitance may be significantly increased, as compared to an existing capacitor having the same size. Therefore, research into the technology described above has been required.

SUMMARY

An aspect of the present disclosure may provide a high-capacitance multilayer ceramic electronic component, of which external electrodes have a thin and uniform thickness, and a method of manufacturing the same.

According to an aspect of the present disclosure, a multilayer ceramic electronic component may include: a ceramic body including dielectric layers and internal electrodes stacked to be alternately exposed to one end surface and the other end surface of the ceramic body, with each of the dielectric layers interposed therebetween; and external electrodes disposed on outer surfaces of the ceramic body, wherein the external electrodes include electrode layers connected to the internal electrodes, electrically insulating layers disposed on the electrode layers, and plating layers disposed on one surface of the ceramic body in a thickness direction of the ceramic body and connected to the electrode layers, respectively, and the electrode layers contain nickel.

According to another aspect of the present disclosure, a method of manufacturing a multilayer ceramic electronic component may include: preparing a plurality of ceramic sheets; forming internal electrode patterns on the respective ceramic sheets using a conductive paste; stacking the ceramic sheets on which the internal electrode pattern is formed to form a ceramic body including internal electrodes disposed therein to face each other; forming electrode layers by transferring a nickel-containing sheet on both end surfaces of the ceramic body in a length direction of the ceramic body so as to be connected to the internal electrodes, respectively; forming electrically insulating layers by attaching a ceramic sheet for forming an electrically insulating layer to the electrode layers, respectively; and preparing external electrodes by forming plating layers on one surface of the ceramic body in a thickness direction of the ceramic body, to be connected to the electrode layers, respectively.

BRIEF DESCRIPTION OF DRAWINGS

The above and other aspects, features, and advantages of the present disclosure will be more clearly understood from the following detailed description when taken in conjunction with the accompanying drawings, in which.

DETAILED DESCRIPTION

Figure 1:
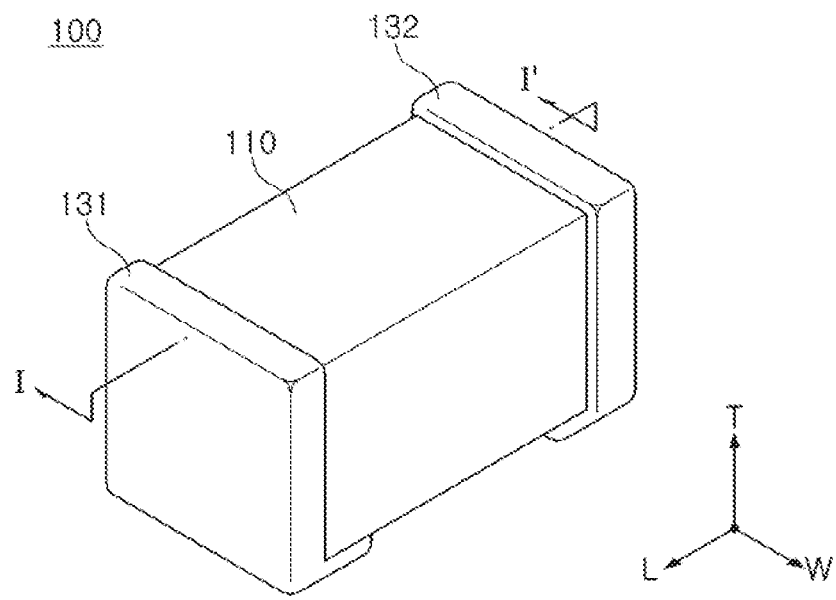
FIG. 1 is a perspective view illustrating a multilayer ceramic electronic component according to an exemplary embodiment in the present disclosure.

Hereinafter, exemplary embodiments of the present disclosure will be described in detail with reference to the accompanying drawings.

Directions of a hexahedron will be defined in order to clearly describe exemplary embodiments in the present disclosure. L, W and T, as illustrated in the drawings, refer to a length direction, a width direction, and a thickness direction, respectively. Here, the thickness direction may be the same as a stacking direction in which dielectric layers are stacked.

Multilayer Ceramic Electronic Component

Hereinafter, a multilayer ceramic electronic component according to an exemplary embodiment in the present disclosure, and, particularly, a multilayer ceramic capacitor, will be described. However, the multilayer ceramic electronic component according to the present disclosure is not limited thereto.

Figure 2:
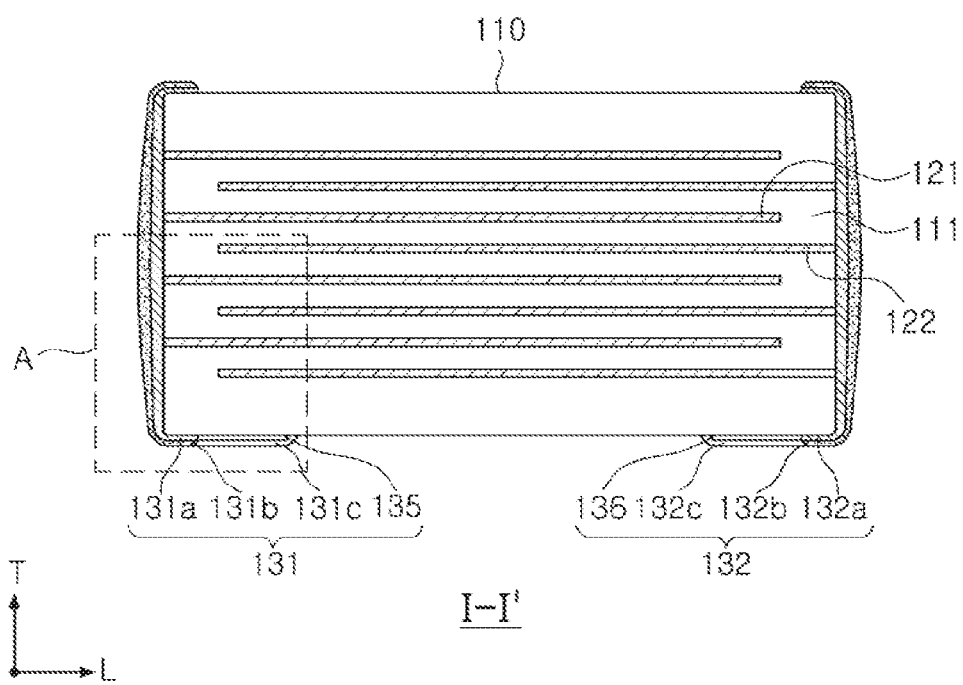
FIG. 2 is a cross-sectional view taken along line I-I' of FIG. 1.
Figure 3:
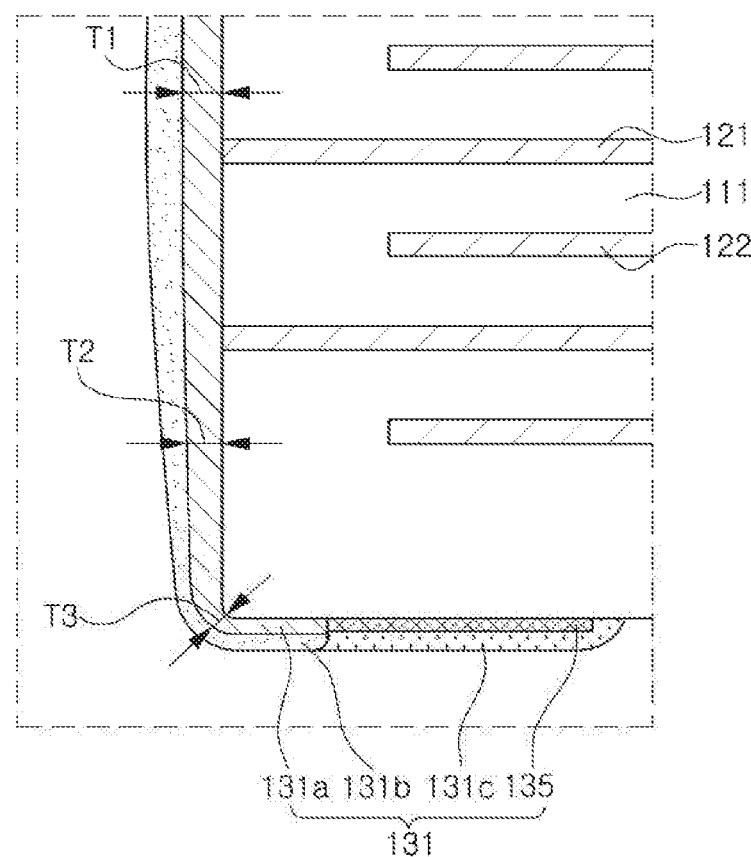
FIG. 3 is an enlarged view of region A of FIG. 2.

FIG. 1 is a perspective view illustrating a multilayer ceramic electronic component according to an exemplary embodiment in the present disclosure, FIG. 2 is a cross-sectional view taken along line I-I' of FIG. 1, and FIG. 3 is an enlarged view of region A of FIG. 2.

Referring to FIGS. 1 through 3, a multilayer ceramic electronic component 100 according to the exemplary embodiment in the present disclosure may include a ceramic body 110, internal electrodes 121 and 122, and external electrodes 131 and 132.

The ceramic body 110 may be formed of a hexahedron having both end surfaces in a length (L) direction, both side surfaces in a width (W) direction, and both side surfaces in a thickness (T) direction. The ceramic body 110 may be formed by stacking a plurality of dielectric layers 111 in the thickness (T) direction and then sintering the plurality of dielectric layers 111. A shape and a dimension of the ceramic body 110 and the number of stacked dielectric layers 111 are not limited to those of an example illustrated in the present exemplary embodiment.

In addition, the plurality of dielectric layers 111 forming the ceramic body 110 may be in a sintered state, and adjacent dielectric layers 111 may be integrated with each other so that boundaries therebetween are not readily apparent without using a scanning electron microscope (SEM).

A thickness of the dielectric layer 111 may be arbitrarily changed, in accordance with a capacitance design of the multilayer ceramic electronic component 100, and the dielectric layer 111 may contain ceramic powders having a high dielectric constant, such as barium titanate ($BaTiO_3$) based powders or strontium titanate ($SrTiO_3$) based powders. However, a material of the dielectric layer 111 according to the present disclosure is not limited thereto. Further, various ceramic additives, an organic solvent, a plasticizer, a binder, a dispersant, and the like, may be added to the ceramic powders, according to the object of the present disclosure.

An average particle size of ceramic powder used to form the dielectric layer 111 is not particularly limited and may be controlled in order to achieve the object of the present disclosure. For example, the average particle size may be controlled to be 400 nm or less.

The internal electrodes 121 and 122 may include a plurality of first internal electrodes 121 and second internal electrodes 122 provided in pairs and having different polarities, and may be formed at a predetermined thickness, with each of the plurality of dielectric layers 111 interposed therebetween, the plurality of dielectric layers 111 being stacked in the thickness (T) direction of the ceramic body 110.

The first internal electrodes 121 and the second internal electrodes 122 may be formed in a stacking direction of the dielectric layers 111 to be alternately exposed to one end surface and the other end surface of the ceramic body 110 in the length (L) direction of the ceramic body 110 and formed of a conductive paste containing a conductive metal printed thereon, and may be electrically insulated from each other by each of the dielectric layers 111 disposed therebetween.

That is, the first and second internal electrodes 121 and 122 may be electrically connected to the first and second external electrodes 131 and 132 formed on both end surfaces of the ceramic body 110 in the length (L) direction of the ceramic body 110 through portions alternately exposed to both end surfaces of the ceramic body 110 in the length direction of the ceramic body 110, respectively.

Therefore, when voltages are applied to the first and second external electrodes 131 and 132, electric charges may be accumulated between the first and second internal electrodes 121 and 122 facing each other. In this case, capacitance of the multilayer ceramic capacitor 100 may be proportional to an area of a region in which the first and second internal electrodes 121 and 122 overlap each other.

That is, when the area of the region in which the first and second internal electrodes 121 and 122 overlap each other is significantly increased, capacitance may be significantly increased, even in a capacitor having the same size.

According to the exemplary embodiment, since thicknesses of the external electrodes are thin and uniform, an area in which the internal electrodes overlap each other may be significantly increased, such that a high-capacitance multilayer ceramic capacitor may be implemented.

Widths of the first and second internal electrodes 121 and 122 may be determined depending on a use of the multilayer ceramic capacitor. For example, the widths of the first and second internal electrodes 121 and 122 may be determined to be in a range of 0.2 to 1.0 µm, in consideration of a size of the ceramic body 110. However, the widths of the first and second internal electrodes 121 and 122 according to the present disclosure are not limited thereto.

In addition, the conductive metal contained in the conductive paste forming the first and second internal electrodes 121 and 122 may be nickel (Ni), copper (Cu), palladium (Pd), silver (Ag), lead (Pb), or platinum (Pt) or alloys thereof. However, the conductive metal according to the present disclosure is not limited thereto.

The external electrodes 131 and 132 may include a first external electrode 131 and a second external electrode 132 disposed on outer surfaces of the ceramic body 110.

The external electrodes 131 and 132 may include first and second electrode layers 131a and 132a, electrically insulating layers 131b and 132b, and plating layers 131c and 132c, as illustrated in FIG. 2.

Further, the external electrodes 131 and 132 may include seed layers 135 and 136, disposed on one surface of the ceramic body 110 in the thickness direction of the ceramic body 110.

The first external electrode 131 may include the first electrode layer 131a electrically connected to the first internal electrode 121, the electrically insulating layer 131b disposed on the first electrode layer 131a, and the plating layer 131c disposed on one surface of the ceramic body 110 in the thickness direction of the ceramic body 110 and connected to the first electrode layer 131a.

Further, the second external electrode 132 may include the second electrode layer 132a electrically connected to the second internal electrode 122, the electrically insulating layer 132b disposed on the second electrode layer 132a, and the plating layer 132c disposed on one surface of the ceramic body 110 in the thickness direction of the ceramic body 110 and connected to the second electrode layer 132a.

The first and second seed layers 135 and 136 electrically connected to the first and second electrode layers 131a and 132a may be further disposed on one surface of the ceramic body 110 in the thickness direction of the ceramic body 110.

Further, the plating layers 131c and 132c may be disposed on the seed layers 135 and 136.

The seed layers 135 and 136 may be formed at a predetermined thickness on one surface of the ceramic body 110 in the thickness (T) direction of the ceramic body 110 by sputtering or depositing a conductive metal, and may be divided and formed on both end portions, respectively, of one surface of the ceramic body 110 in the thickness (T) direction of the ceramic body 110.

The seed layers 135 and 136 may also be formed on one surface of the ceramic body 110 in the thickness (T) direction of the ceramic body 110 by printing a conductive paste containing a conductive metal.

The conductive metal forming the seed layers 135 and 136 may be the same as that used in the first and second internal electrodes 121 and 122, but is not limited thereto. For example, the conductive metal may be copper (Cu), nickel (Ni), palladium (Pd), platinum (Pt), gold (Au), silver (Ag), lead (Pb), or alloys thereof.

As a method of forming an external electrode used in the related art, a method of dipping the ceramic body 110 in a paste containing a metal ingredient has principally been used.

In a case in which the external electrode is formed by the dipping method, the paste is not uniformly applied due to fluidity and viscosity of the paste, such that there is a difference in application thickness between a central portion and a corner portion of the external electrode.

In a case in which the thickness of the external electrode is not uniform, as described above, glass beading or blister is generated in the central portion, in which the paste is applied in a thicker thickness than that of an edge portion, which may cause a plating defect and a shape defect, and the corner portion in which the paste is applied in a thin thickness is vulnerable to permeation of a plating solution, such that reliability is deteriorated.

In addition, in a case of complementing the corner portion vulnerable to the plating solution, a thickness of the central portion in which the paste is applied may be increased, and there is a limitation in increasing a size of a ceramic capacitor in order to increase capacitance.

According to the exemplary embodiment, the first and second external electrodes 131 and 132 may include the first and second electrode layers 131a and 132a electrically connected to the first and second internal electrodes 121 and 122, the electrically insulating layers 131b and 132b disposed on the first and second electrode layers 131a and 132a, and the plating layers 131c and 132c disposed on one surface of the ceramic body 110 in the thickness direction of the ceramic body 110 and connected to the first and second electrode layers 131a and 132a, respectively.

The seed layers 135 and 136 electrically connected to the first and second electrode layers 131a and 132a may be further disposed on one surface of the ceramic body 110 in the thickness direction of the ceramic body 110.

Further, the plating layers 131c and 132c may be disposed on the seed layers 135 and 136.

The first and second electrode layers 131a and 132a may be disposed on both end surfaces of the ceramic body 110 in the length (L) direction of the ceramic body 110, respectively, among outer surfaces of the ceramic body 110. However, the first and second electrode layers 131a and 132a are not limited thereto.

Therefore, the first and second electrode layers 131a and 132a may be disposed on both end surfaces of the ceramic body 110 in the length (L) direction of the ceramic body 110, respectively, and the electrically insulating layers 131b and 132b may be disposed on the first and second electrode layers 131a and 132a.

According to the exemplary embodiment, the first and second electrode layers 131a and 132a may be disposed on both end surfaces of the ceramic body 110 in the length (L) direction of the ceramic body 110, respectively, and may also be extended onto portions of both surfaces of the ceramic body 110 in the thickness direction of the ceramic body 110, respectively.

Since the first and second electrode layers 131a and 132a are not formed by the dipping method used in the related art, but are formed by transferring a sheet containing a conductive metal, the first and second electrode layers 131a and 132a may be formed on head surfaces corresponding to the end surfaces of the ceramic body 110 in the length (L) direction of the ceramic body 110, and may or may not be formed at sizes as small as possible on all band surfaces, corresponding to the four surfaces contacting the head surfaces.

Therefore, the thicknesses of the external electrodes disposed on the outer surfaces of the ceramic body may be thin and uniform.

Thus, since the thicknesses of the external electrodes disposed on the outer surfaces of the ceramic body are thin and uniform, formation areas of the internal electrodes may be increased, such that areas in which the internal electrodes overlap each other may be significantly increased, whereby a high-capacitance multilayer ceramic capacitor may be implemented.

According to the exemplary embodiment, the first and second electrode layers 131a and 132a may be formed by a sheet transfer method or a pad transfer method, detailed contents of which will be described below, and unlike the dipping method used in the related art.

In particular, according to the exemplary embodiment, the first and second electrode layers 131a and 132a may be formed by the sheet transfer method or the pad transfer method, to thereby be disposed on both end surfaces of the ceramic body 110 in the length direction of the ceramic body 110, and the electrically insulating layers may be disposed thereon by transferring a ceramic sheet for forming an electrically insulating layer, such that at the time of mounting the electronic component on a board, a structure in which solder is not disposed on the end surfaces of the electronic component but is disposed only on a mounting surface of the electronic component may be implemented, whereby a mounting density may be increased.

That is, the first and second electrode layers 131a and 132a may be disposed on both ends of the ceramic body 110 in the length (L) direction of the ceramic body 110, the electrically insulating layers 131b and 132b may be disposed on the first and second electrode layers 131a and 132a, the seed layers 135 and 136 electrically connected to the first electrode layers 131a and 132a may be further disposed on one surface of the ceramic body in the thickness direction of the ceramic body, corresponding to the mounting surface at the time of mounting the electronic component on the board, and the plating layers 131c and 132c may be disposed on the seed layers 135 and 136, such that a mounting area may be decreased, as compared to the related art.

Referring to FIGS. 2 and 3, a structure in which the first and second electrode layers 131a and 132a and the electrically insulating layers 131b and 132b may be disposed on both end surfaces of the ceramic body 110 in the length direction of the ceramic body 110, and the seed layers 135 and 136 and the plating layers 131c and 132c connected to the first and second electrode layers 131a and 132a are disposed on one surface of the ceramic body 110 in the thickness direction of the ceramic body 110, is illustrated.

According to the exemplary embodiment, the first and second electrode layers 131a and 132a may contain nickel (Ni).

Since the first and second electrode layers 131a and 132a in the external electrodes 131 and 132 may contain nickel, hermetic sealing of the ceramic body 110 may be improved, such that deterioration of reliability due to permeation of the plating solution may be prevented.

The plating layers 131c and 132c may be disposed on the seed layers 135 and 136.

That is, the plating layers 131c and 132c may be disposed on the seed layers 135 and 136, disposed on one surface of the ceramic body 110 in the thickness (T) direction of the ceramic body 110 corresponding to the mounting surface, at the time of mounting the electronic component on the board.

In particular, according to the exemplary embodiment, since the first and second electrode layers 131a and 132a are formed by the sheet transfer method instead of the dipping method used in the related art, and the electrically insulating layers 131b and 132b are formed by transferring the ceramic sheet for forming an electrically insulating layer thereon, the first and second electrode layers and the electrically insulating layers may be disposed on the head surfaces of the ceramic body 110, which are the end surfaces of the ceramic body 110 in the length (L) direction of the ceramic body 110, and the seed layers 135 and 136 and the plating layers 131c and 132c may be disposed on one surface of the ceramic body 110 in the thickness (T) direction of the ceramic body 110.

Therefore, the plating layers 131c and 132c may be formed on one surface of the ceramic body 110 in the thickness (T) direction of the ceramic body 110 but are not formed on both end surfaces of the ceramic body 110 in the length direction and on both side surfaces of the ceramic body 110 in the width direction.

The plating layers 131c and 132c may be nickel plating layers and tin plating layers, but are not limited thereto.

Referring to FIG. 3, when a thickness of each of the first and second electrode layers 131a and 132a in a central region of the ceramic body 110, and in the thickness direction of the ceramic body 110 is T1, and a thickness of each of the first and second electrode layers 131a and 132a, at a point at which an outermost internal electrode 121 or 122 among the internal electrodes 121 and 122 is positioned, is T2, $0.8 \leq T2/T1 \leq 1.2$.

The thickness T1 of each of the first and second electrode layers 131a and 132a in the central region of the ceramic body 110, in the thickness direction of the ceramic body 110, refers to a thickness of each of the first and second electrode layers 131a and 132a, at a point at which a virtual line drawn in the length direction of the ceramic body 110, from a central point of the ceramic body 110 in the thickness direction of the ceramic body 110, meets the end surface of the ceramic body 110.

Likewise, the thickness T2 of each of the first and second electrode layers 131a and 132a, at the point at which the outermost internal electrode 121 or 122 among the internal electrodes 121 and 122 is positioned, refers to a thickness of each of the first and second electrode layers 131a and 132a, at a point at which a virtual line drawn in the length direction of the ceramic body 110 from a position of an internal electrode disposed in the outermost portion of the ceramic body 110, in the thickness direction of the ceramic body 110, will meet the end surface of the ceramic body 110.

$0.8 \leq T2/T1 \leq 1.2$ may be satisfied to reduce a deviation between the thickness T1 of each of the first and second electrode layers 131a and 132a in the central region of the ceramic body 110, in the thickness direction of the ceramic body 110, and the thickness T2 of each of the first and second electrode layers 131a and 132a, at the point at which the outermost internal electrode 121 or 122 among the internal electrodes 121 and 122 is positioned, whereby a deterioration of reliability may be prevented.

In a case in which T2/T1 is less than 0.8 or exceeds 1.2, a deviation between thicknesses of the first and second electrode layers 131a and 132a is large, such that a plating solution may penetrate into a portion having a thin thickness, thereby deteriorating reliability.

According to the exemplary embodiment, when a thickness of each of the first and second electrode layers 131a and 132a in corner portions of the ceramic body 110 is T3, $0.4 \leq T3/T1 \leq 1.0$.

The thickness T3 of each of the first and second electrode layers 131a and 132a in the corner portions of the ceramic body 110 refers to a thickness of each of the first and second electrode layers 131a and 132a formed in corner regions of the ceramic body 110, and is the thickness along the diagonal direction of the ceramic body 110.

$0.4 \leq T3/T1 \leq 1.0$ may be satisfied to reduce a deviation between the thickness T1 of each of the first and second electrode layers 131a and 132a in the central region of the ceramic body 110, in the thickness direction of the ceramic body 110, and the thickness T3 of each of the first and second electrode layers 131a and 132a in the corner portions of the ceramic body 110, whereby deterioration of reliability may be prevented.

In a case in which T3/T1 is less than 0.4 or exceeds 1.0, a deviation between thicknesses of the first and second electrode layers 131a and 132a is large, such that a plating solution may penetrate into a portion having a thin thickness, thereby deteriorating reliability.

Method of Manufacturing Multilayer Ceramic Electronic Component

In the method of manufacturing a multilayer ceramic electronic component according to the exemplary embodiment, first, slurry containing powders such as barium titanate ($BaTiO_3$) powders, or the like, may be applied onto carrier films and dried to prepare a plurality of ceramic sheets, thereby forming dielectric layers.

The ceramic sheets may be manufactured by mixing ceramic powders, a binder, and a solvent with each other to prepare slurry, and manufacturing the slurry in a form of sheets having a thickness of several micrometers by a doctor blade method.

Then, a conductive paste containing conductive metal powders may be prepared. The conductive metal powders may be formed of nickel (Ni), copper (Cu), palladium (Pd), silver (Ag), lead (Pb), or platinum (Pt), or alloys thereof, and have an average particle size of 0.1 to 0.2 μm, and a conductive paste for an internal electrode containing 40 wt % to 50 wt % of the conductive metal powders may be prepared.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode pattern is printed may be stacked, pressed, and sintered, such that a ceramic body may be manufactured.

Figure 4:
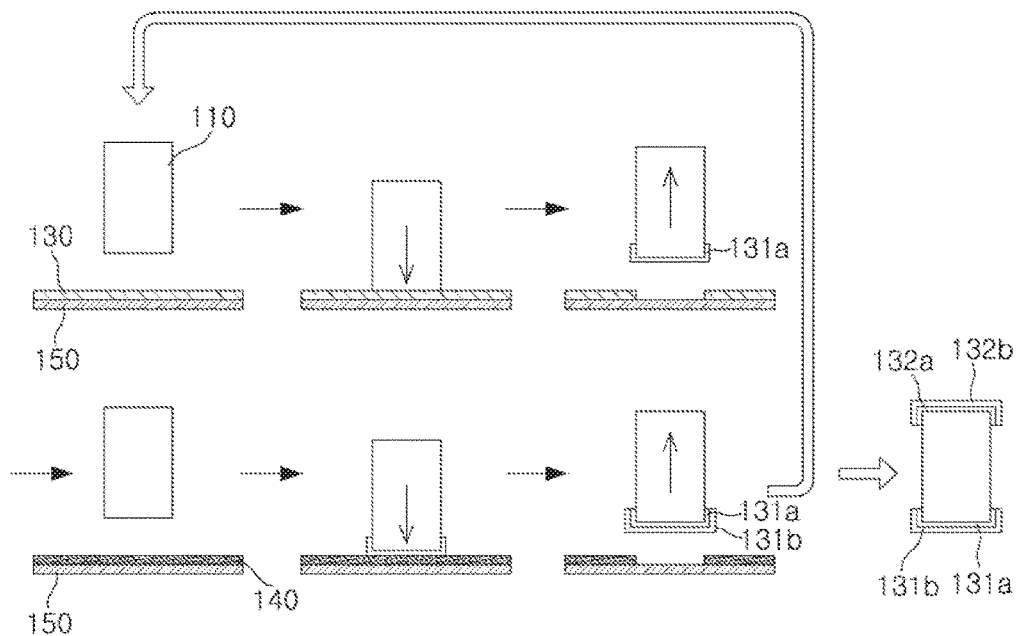
FIG. 4 is a view illustrating a process of forming external electrodes of the multilayer ceramic electronic component according to the exemplary embodiment in the present disclosure.

FIG. 4 is a view illustrating a process of forming external electrodes of the multilayer ceramic electronic component according to the exemplary embodiment in the present disclosure.

Referring to FIG. 4, the first and second electrode layers 131a and 132a may be formed by transferring a nickel-containing sheet 130 onto both end surfaces of the ceramic body 110 in the length direction of the ceramic body 110, so as to be connected to the internal electrodes.

The method of forming the first and second electrode layers may be performed by forming the first electrode layer on one end surface of the ceramic body and then forming the second electrode layer on the other end surface of the ceramic body, and electrically insulating layers, to be described below, may be formed by the same method.

Hereinafter, a method of forming the first electrode layer and the electrically insulating layer on one end surface of the ceramic body will be described, and this method may also be equally applied at the time of forming the second electrode layer and the electrically insulating layer on the other end surface of the ceramic body.

The nickel-containing sheet 130 may be formed by applying a conductive metal paste containing nickel on a polyethylene terephthalate (PET) film 150.

After preparing the nickel-containing sheet 130, which has been attached to the PET film, one end surface of the ceramic body 110 in the length direction of the ceramic body 110 may be made to closely adhere to the nickel-containing sheet 130 by applying a pressure to the nickel-containing sheet 130, such that the nickel-containing sheet 130 may be transferred to both end surfaces of the ceramic body 110 in the length direction of the ceramic body, so as to be connected to the internal electrodes, thereby forming the first and second electrode layers 131a and 132a.

In this case, the sheet may be attached to the ceramic body so as to be extended from the head surfaces of the ceramic body, which are the end surfaces of the ceramic body 110 in the length direction of the ceramic body, to band surfaces of the ceramic body, by applying heat to the PET film 150, to increase flexibility of the nickel-containing sheet 130, and, at the same time, improving adhesion between the body and sheet.

Next, in order to remove an unnecessary portion of the sheet attached to the ceramic body, the ceramic body 110 to which the nickel-containing sheet 130 is attached is pressed through the PET film 150, such that a portion of the sheet that is not attached to the body may be removed by elasticity.

Here, the nickel-containing sheet 130 may be cut by the PET film at corner portions of the ceramic body, and at the time of removing pressure, the nickel-containing sheet 130 may be attached only to the head surfaces of the ceramic body.

In this case, portions of the sheets that are not attached to the ceramic body remain on the PET films, such that a separate process of removing unnecessary sheets may be omitted.

According to the method described above, the first and second electrode layers may be formed on the head surfaces, corresponding to both end surfaces of the ceramic body in the length direction of the ceramic body, and thicknesses of the external electrodes may be decreased, whereby a high-capacitance multilayer ceramic capacitor may be implemented.

Then, the electrically insulating layers 131b and 132b may be formed by attaching a ceramic sheet 140 for forming an electrically insulating layer to the first and second electrode layers 131a and 132a.

The ceramic sheet 140 for forming an electrically insulating layer may be attached onto the PET film 150.

After preparing the ceramic sheet 140 for forming an electrically insulating layer, attached onto the PET film 150, the electrically insulating layers 131b and 132b may be formed on the first and second electrode layers 131a and 132a by causing one end surface of the ceramic body 110 in the length direction of the ceramic body to closely adhere to the ceramic sheet 140 for forming an electrically insulating layer, while applying a pressure.

Next, in order to remove an unnecessary portion of the sheet attached to the ceramic body, the ceramic body 110 to which the ceramic sheet 140 for forming an electrically insulating layer is attached is pressed through the PET film 150, such that a portion of the sheet that is not attached to the body may be removed by elasticity.

Here, the ceramic sheet 140 for forming an electrically insulating layer may be cut by the PET film at the corner portions of the ceramic body, and at the time of removing pressure, the sheet 140 for forming an electrically insulating layer may be attached only to the head surfaces of the ceramic body.

In this case, portions of the sheets that are not attached onto the ceramic body remain on the PET films, such that a separate process of removing unnecessary sheets may be omitted.

According to the exemplary embodiment, the first and second electrode layers 131a and 132a may be formed by the sheet transfer method or the pad transfer method to thereby be disposed on both end surfaces of the ceramic body 110 in the length direction of the ceramic body 110, and the electrically insulating layers 131b and 132b may be disposed on the first electrodes 131a and 132a by transferring the ceramic sheet for forming an electrically insulating layer, such that at the time of mounting the electronic component on a board, a structure in which solder is not disposed on the side surfaces of the electronic component but is disposed only on amounting surface of the electronic component may be implemented, whereby a mounting density may be increased.

Next, seed layers 135 and 136 may be formed on one surface of the ceramic body 110 in the thickness (T) direction of the ceramic body 110, and the plating layers 131c and 132c may be formed thereon.

In particular, according to the exemplary embodiment in the present disclosure, since the first and second electrode layers 131a and 132a are not formed by the dipping method used in the related art, the first and second electrode layers 131a and 132a may be formed on the head surfaces corresponding to the end surfaces of the ceramic body 110 in the length (L) direction of the ceramic body 110, and the seed layers 135 and 136 and the plating layers 131c and 132c may be formed on one surface of the ceramic body 110 in the thickness (T) direction of the ceramic body 110, corresponding to the mounting surface at the time of mounting the electronic component on the board.

A method of forming the seed layers 135 and 136 may be, for example a screen printing method, a gravure printing method, or the like. However, the method of forming the seed layers is not limited thereto, but may also be a sputtering method or a depositing method.

The plating layers 131c and 132c may be nickel plating layers and tin plating layers disposed on the nickel plating layers, but are not limited thereto.

According to the exemplary embodiment, after forming the first and second electrode layers 131a and 132a and the electrically insulating layers 131b and 132b, the ceramic body 110, the first and second electrode layers 131a and 132a, and the electrically insulating layers 131b and 132b may be sintered simultaneously.

Since the first and second electrode layers 131a and 132a and the electrically insulating layers 131b and 132b are formed by the sheet transfer method or the pad transfer method instead of the dipping method used in the related art, the ceramic body may be in a green chip state.

That is, after forming the first and second electrode layers 131a and 132a and the electrically insulating layers 131b and 132b, the ceramic body 110, the first and second electrode layers 131a and 132a, and the electrically insulating layers 131b and 132b may be sintered simultaneously.

Therefore, as compared to a method of separately sintering external electrodes used in the related art, a manufacturing process may be simplified, whereby productivity may be improved.

Figure 5:
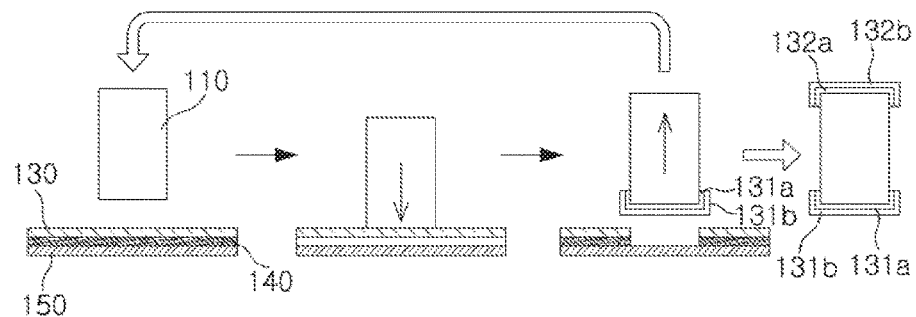
FIG. 5 is a view illustrating a process of forming external electrodes of a multilayer ceramic electronic component according to another exemplary embodiment in the present disclosure.

FIG. 5 is view illustrating a process of forming external electrodes of a multilayer ceramic electronic component according to another exemplary embodiment in the present disclosure.

Referring to FIG. 5, in a method of forming the external electrodes of the multilayer ceramic electronic component according to another exemplary embodiment in the present disclosure, first and second electrode layers 131a and 132a and electrically insulating layers 131b and 132b may be simultaneously transferred to both end surfaces of the ceramic body 110, unlike the method of forming the external electrodes of the multilayer ceramic electronic component according to the exemplary embodiment in the present disclosure.

That is, a ceramic sheet 140 for forming an electrically insulating layer may be attached onto a PET film 150, and a nickel-containing sheet 130 may be prepared by applying a conductive metal paste containing nickel (Ni) on the ceramic sheet 140 for forming an electrically insulating layer.

After preparing a material in which the nickel-containing sheet 130, the ceramic sheet 140 for forming an electrically insulating layer, and the PET film 150 are sequentially stacked, one end surface of the ceramic body 110 in the length direction of the ceramic body 110 may be made to closely adhere, to the nickel-containing sheet 130 by applying a pressure to the nickel-containing sheet 130 so that the pressure is applied up to the ceramic sheet 140 for forming an electrically insulating layer, such that the nickel-containing sheet 130 may be transferred to both end surfaces of the ceramic body 110 in the length direction of the ceramic body so as to be connected to the internal electrodes, whereby the first electrode layer 131a and the electrically insulating layer 131b may be formed at the same time, and the second electrode layer 132a and the electrically insulating layer 132b may be formed at the same time.

In this case, the sheet may be attached to the ceramic body so as to be extended from the head surfaces of the ceramic body, which are the end surfaces of the ceramic body 110 in the length direction of the ceramic body, to band surfaces of the ceramic body by applying heat to the PET film 150 to increase flexibility of the nickel-containing sheet 130, and, at the same time, improve adhesion between the body and sheet.

Next, in order to remove unnecessary portions of the sheets attached to the ceramic body, the ceramic body 110 to which the ceramic sheet 140 for forming an electrically insulating layer and the nickel-containing sheet 130 are attached is pressed together with the PET film 150, such that portions of the sheets that are not attached to the body may be removed by elasticity.

Here, the ceramic sheet 140 for forming an electrically insulating layer and the nickel-containing sheet 130 may be cut by the PET film at corner portions of the ceramic body, and, at the time of removing pressure, the ceramic sheet 140 for forming an electrically insulating layer and the nickel-containing sheet 130 may be attached only to the head surfaces of the ceramic body.

In this case, portions of the sheets that are not attached to the ceramic body remain on the PET films, such that a separate process of removing unnecessary sheets may be omitted.

According to the method described above, the first and second electrode layers may be formed only on the head surfaces, corresponding to both end surfaces of the ceramic body in the length direction of the ceramic body, and thicknesses of the external electrodes may be decreased, whereby a high-capacitance multilayer ceramic capacitor may be implemented.

According to another exemplary embodiment, after forming the first and second electrode layers 131a and 132a and the electrically insulating layers 131b and 132b, the ceramic body 110, the first and second electrode layers 131a and 132a, and the electrically insulating layers 131b and 132b may be sintered simultaneously.

Since the first and second electrode layers 131a and 132a and the electrically insulating layers 131b and 132b are formed by the sheet transfer method or the pad transfer method instead of the dipping method used in the related art, the ceramic body may be in a green chip state.

That is, after forming the first and second electrode layers 131a and 132a and the electrically insulating layers 131b and 132b, the ceramic body 110, the first and second electrode layers 131a and 132a, and the electrically insulating layers 131b and 132b may be sintered simultaneously.

Therefore, as compared to a method of separately sintering external electrodes used in the related art, a manufacturing process may be simplified, whereby productivity may be improved.

Contents overlapping those described in the multilayer ceramic electronic component according to the exemplary embodiment described above will be omitted.

As set forth above, in the multilayer ceramic electronic component according to the exemplary embodiments in the present disclosure, the external electrodes may have a thin and uniform thickness, and thus formation areas of the internal electrodes may be increased, such that areas in which the internal electrodes overlap each other may be significantly increased, whereby a high-capacitance multilayer ceramic electronic component may be implemented.

Further, since the first and second electrode layers of the external electrodes contain nickel, hermetic sealing may be improved, such that reliability may be improved.

In addition, since the electrically insulating layers are formed by transferring the ceramic sheets onto the first and second electrode layers disposed on both end surfaces of the ceramic body in the length direction of the ceramic body, the structure in which the solder is not disposed on the end surfaces but is disposed only on the mounting surface of the ceramic body may be implemented, whereby the mounting density may be increased.

While exemplary embodiments have been shown and described above, it will be apparent to those skilled in the art that modifications and variations could be made without departing from the scope of the present invention, as defined by the appended claims.

What is claimed is:

1. A multilayer ceramic electronic component comprising:
a ceramic body including dielectric layers, and internal electrodes stacked in a thickness direction to be alternately exposed to a first end surface and a second end surface of the ceramic body opposing the first end surface in a length direction of the ceramic body, with one of the dielectric layers interposed therebetween;
a first external electrode including a first electrode layer which is disposed on the first end surface of the ceramic body and which extends from the first end surface onto portions of third and fourth surfaces of the ceramic body opposing each other in the thickness direction of the ceramic body; and
a second external electrode including a second electrode layer which is disposed on the second end surface of the ceramic body and which extends from the second end surface onto other portions of third and fourth surfaces of the ceramic body,
wherein the first external electrode further includes a first electrically insulating layer disposed on the first end surface and the portions of the third and fourth surfaces of the ceramic body to cover the first electrode layer, and a first plating layers disposed on the third surface of the ceramic body and electrically connected to the first electrode layer,
the second external electrode further includes a second electrically insulating layer disposed on the second end surface and the other portions of the third and fourth surfaces of the ceramic body to cover the second electrode layer, and a second plating layers disposed on the one of the third and fourth surfaces of the ceramic body and electrically connected to the second electrode layer,
the first and second electrode layers contain nickel,
the multilayer ceramic electronic component further comprises:
a first seed layer extending from an end of the first electrode layer and disposed directly on the third surface; and
a second seed layer extending from an end of the second electrode layer and disposed directly on the third surface, the first seed layer and the second seed layer extending linearly toward each other, and
the first and second plating layers are disposed on the first and second seed layers, respectively.

2. The multilayer ceramic electronic component of claim 1, wherein the first and second seed layers are disposed only on the third surface of the ceramic body.

3. The multilayer ceramic electronic component of claim 2, wherein the first and second seed layers are spaced apart from the first and second end surfaces.

4. The multilayer ceramic electronic component of claim 1, wherein $0.8 \leq T2/T1 \leq 1.2$, in which T1 is a thickness of each of the first and second electrode layers in a central region of the ceramic body in the thickness direction of the ceramic body, and T2 is a thickness of each of the first and second electrode layers at a point at which an outermost internal electrode among the internal electrodes is positioned.

5. The multilayer ceramic electronic component of claim 4, wherein $0.4 \leq T3/T1 \leq 1.0$, in which T3 is a thickness of each of the first and second electrode layers in corner portions of the ceramic body.

6. The multilayer ceramic electronic component of claim 1, wherein the third surface of the ceramic body in the thickness direction of the ceramic body is a mounting surface of the multilayer ceramic electronic component mounted on a board.

7. A multilayer ceramic electronic component comprising:
a ceramic body including dielectric layers, and internal electrodes stacked in a thickness direction to be alternately exposed to a first end surface and a second end surface of the ceramic body opposing the first end surface in a length direction of the ceramic body, with one of the dielectric layers interposed therebetween;
a first external electrode including a first electrode layer which is disposed on the first end surface of the ceramic body and which extends from the first end surface onto portions of third and fourth surfaces of the ceramic body opposing each other in the thickness direction of the ceramic body; and
a second external electrode including a second electrode layer which is disposed on the second end surface of the ceramic body and which extends from the second end surface onto other portions of third and fourth surfaces of the ceramic body,
wherein the first external electrode further includes a first electrically insulating layer disposed on the first end surface and the portions of the third and fourth surfaces of the ceramic body to cover the first electrode layer, and a first plating layers disposed on the third surface of the ceramic body and electrically connected to the first electrode layer,
the second external electrode further includes a second electrically insulating layer disposed on the second end surface and the other portions of the third and fourth surfaces of the ceramic body to cover the second electrode layer, and a second plating layers disposed on the third surface of the ceramic body and electrically connected to the second electrode layer,
the first electrode layer and the first electrically insulating layer are conterminous with each other and have a same area, and
the second electrode layer and the second electrically insulating layer are conterminous with each other and have a same area.

8. The multilayer ceramic electronic component of claim 7, further comprising:
a first seed layer electrically connected to the first electrode layer and disposed on the third surface of the ceramic body; and
a second seed layer electrically connected to the second electrode layer and disposed on the third surface of the ceramic body, wherein the first and second plating layers are disposed on the first and second seed layers, respectively.

9. The multilayer ceramic electronic component of claim 8, wherein the first and second seed layers are spaced apart from the first and second end surfaces.

10. The multilayer ceramic electronic component of claim 8, wherein the first and second seed layers are disposed only on the third surface of the ceramic body.

11. The multilayer ceramic electronic component of claim 7, wherein $0.8 \leq T2/T1 \leq 1.2$, in which T1 is a thickness of each of the first and second electrode layers in a central region of the ceramic body in the thickness direction of the ceramic body, and T2 is a thickness of each of the first and second electrode layers at a point at which an outermost internal electrode among the internal electrodes is positioned.

12. The multilayer ceramic electronic component of claim 11, wherein $0.4 \leq T3/T1 \leq 1.0$, in which T3 is a thickness of each of the first and second electrode layers in corner portions of the ceramic body.

13. The multilayer ceramic electronic component of claim 7, wherein the third surface is a mounting surface of the multilayer ceramic electronic component mounted on a board.

14. The multilayer ceramic electronic component of claim 7, wherein the first and second electrode layers contain nickel.

* * * * *